United States Patent [19]

Sanders et al.

[11] Patent Number: 5,894,936
[45] Date of Patent: Apr. 20, 1999

[54] DRUM SEPARATOR FOR BRINE SHRIMP EGGS

[75] Inventors: Larry Sanders; David Kuehn, both of Ogden, Utah

[73] Assignee: Sanders Brine Shrimp Company, Inc,

[21] Appl. No.: 08/903,479

[22] Filed: Jul. 30, 1997

[51] Int. Cl.⁶ .............................. B07B 1/22; B07B 1/50; A01K 61/00; A01K 63/04
[52] U.S. Cl. ................ 209/270; 209/380; 210/403; 119/216; 119/218; 119/232
[58] Field of Search ........................ 209/268, 270, 209/288, 380; 210/402, 403; 119/216, 217, 218, 232

[56] References Cited

U.S. PATENT DOCUMENTS

| | | | |
|---|---|---|---|
| 686,263 | 11/1901 | Conley | 210/403 |
| 1,451,522 | 4/1923 | Baxter | 210/403 |
| 1,458,393 | 7/1923 | Chapman . | |
| 1,792,935 | 6/1931 | Schwieter . | |
| 2,228,185 | 1/1941 | Thompson | 210/403 |
| 2,286,132 | 6/1942 | Walle | 210/403 |
| 2,653,393 | 12/1953 | Bojner . | |
| 2,816,742 | 2/1957 | Richterkessing et al. . | |
| 2,960,778 | 6/1960 | Cowlin . | |
| 3,543,415 | 12/1970 | Meyer . | |
| 3,874,092 | 4/1975 | Huttlin . | |
| 3,950,861 | 4/1976 | Weimer et al. . | |
| 4,602,440 | 7/1986 | Genoni . | |
| 4,785,759 | 11/1988 | Motoyama et al. . | |
| 4,854,941 | 8/1989 | Chedgy . | |
| 4,869,823 | 9/1989 | Otani et al. | 210/403 |
| 4,958,443 | 9/1990 | Haueter et al. . | |
| 5,133,860 | 7/1992 | Tai | 210/403 |
| 5,334,244 | 8/1994 | Bohle . | |
| 5,632,097 | 5/1997 | Snitchler et al. . | |

*Primary Examiner*—H. Grant Skaggs
*Assistant Examiner*—Joe Dillion, Jr.
*Attorney, Agent, or Firm*—Thorpe, North & Western LLP

[57] ABSTRACT

A drum separator for separating brine shrimp eggs from a slurry containing an agglomeration of adult brine shrimp, brine shrimp eggs and debris includes a fluid source to maintain a slurry. The fluid source may be an internal spray jet disposed to spray against the slurry inside the drum for breaking up the agglomeration of adult brine shrimp, brine shrimp eggs and debris so that the brine shrimp eggs may pass through openings formed in the drum. An external spray jet is disposed to spray against the exterior surface of the drum for cleaning the adult brine shrimp and debris out of the openings in the drum. The internal spray jet is preferably an elongated pipe having a plurality of openings and is disposed inside the rotating drum. The external spray jet is preferably an elongated pipe with a plurality of openings and is disposed along the exterior of the rotating drum.

27 Claims, 6 Drawing Sheets

DRUM SEPARATOR FOR BRINE SHRIMP EGGS

BACKGROUND OF THE INVENTION

1. Field of the Invention

The present invention relates to an apparatus and method for separating brine shrimp eggs (artemia cysts) from a slurry containing an agglomeration of adult brine shrimp (artemia), artemia cysts, and debris. More particularly, the present invention relates to introducing the slurry into a rotating drum having openings to allow the cysts to pass through, providing a liquid source to maintain the slurry, and disposing a spray nozzle to spray against the outside surface of the drum to clean the adult brine shrimp and debris from the openings.

2. Prior Art

Brine shrimp of the genus Artemia, and specifically of the species *Atremia salina*, are primitive crustaceans which normally inhabit bodies of water having a high saline content, such as the Great Salt Lake in Utah. Brine shrimp serve as a source of food for many fish. Brine shrimp have been harvested for many years and are used as fish food on a commercial basis. Brine shrimp eggs are contained within protective spherical cysts or shells of hemoglobin. Brine shrimp eggs are remarkable in that they can be dried and stored and then hatched years later by returning them to salt water. The eggs may be nurtured to shrimp which are used as food in shrimp farms and the like producing food for human consumption. The ability to stockpile dried brine shrimp eggs for future hatching has made commercial harvesting of the eggs a profitable venture.

Brine shrimp and their eggs agglomerate in floating colonies at the surface of the water. Typically, the eggs occupy the top one quarter inch of water. The eggs are extremely small; approximately seven million brine shrimp eggs are contained in a single ounce. Adult brine shrimp are a thousand times larger than the egg.

The eggs are harvested by collecting the eggs left along the beaches or by off-shore harvesters. Due to the small size of the eggs, they are very difficult to harvest. In addition, because of the nature of the adult brine shrimp to agglomerate, the eggs are harvested along with adult brine shrimp and other debris.

Attempts have been made to screen the slurry of shrimp, eggs and debris in order to separate the eggs from the debris and adult brine shrimp. This is difficult because the adult brine shrimp agglomerate, trapping the eggs. In addition, the debris and adult shrimp tend to clog the openings in the screen, preventing eggs from passing through the screen.

Typical prior art devices and methods for screening the eggs comprise a horizontal screen which is vibrated. The brine shrimp and the debris clog the openings of the screen requiring the process to be stopped in order to clean the screens. Thus, these devices and methods require that the separation process be done in batches which is slow and inefficient. A more continuous device and method which configures the screen as a conveyor belt has been attempted with limited success.

Therefore it would be advantageous to develop an apparatus and method for separating brine shrimp eggs from a slurry containing an agglomeration of adult brine shrimp, eggs and other debris.

OBJECTS AND SUMMARY OF THE INVENTION

It is an object of the present invention to provide an apparatus and method for separating artemia cysts from a slurry containing an agglomeration of artemia, cysts and other debris.

It is another object of the present invention to provide an apparatus and method for breaking up the agglomeration of artemia, cysts and debris.

It is yet another object of the present invention to provide an apparatus and method for separating artemia cysts without becoming clogged by artemia or debris.

It is a further object of the present invention to provide an apparatus and method for separating artemia cysts from a slurry containing an agglomeration of artemia, cysts and debris without damaging the delicate cysts.

These and other objects and advantages of the present invention are realized by a feed means for introducing an agglomeration of artemia, artemia cysts and debris into a rotating drum having openings sized to allow the artemia cysts to pass through the openings and out of the drum. The artemia, cysts and debris may be introduced into the drum as a slurry or dry. A liquid source is provided to add a liquid to create or maintain the artemia, cysts and debris as a slurry within the drum. The liquid source may be an internal spray nozzle disposed to spray against the slurry for breaking up the agglomeration in addition to adding liquid. An external spray jet is disposed to spray against the exterior surface of the drum to clean artemia and debris from the openings. The drum is open at one end for permitting the artemia and debris to exit the drum. An artemia cysts collecting means collects the cysts that pass through the openings and out of the drum.

In a preferred embodiment of the present invention, a pipe introduces the artemia, cysts and debris as a slurry through one end of the rotating drum. The drum is disposed substantially horizontally. The liquid source in an internal spray jet disposed within the drum to provide water to maintain the slurry and sprays against the slurry to break up the agglomeration. The external spray jet is disposed along the outer surface of the drum and sprays against the openings. The artemia and debris exit the opposite end of the drum. The cysts pass through the openings and are collected in a pan underneath the drum. A plurality of blades may be disposed at an angle on the inner surface of the drum for moving the slurry along the length of the drum.

In an alternative embodiment of the present invention, the rotating drum is disposed at an angle with respect to the ground for moving the slurry along the length of the drum.

In another alternative embodiment of the present invention, the drum has a conical shape with the axis disposed substantially horizontally. The slope of the cone helps move the slurry along the length of the drum. Alternatively, the conical drum may be disposed so that the drum surface is horizontal.

In another alternative embodiment of the present invention, the artemia, cysts and debris are introduced into the drum at its midpoint and the slurry flows towards each end of the drum.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1:
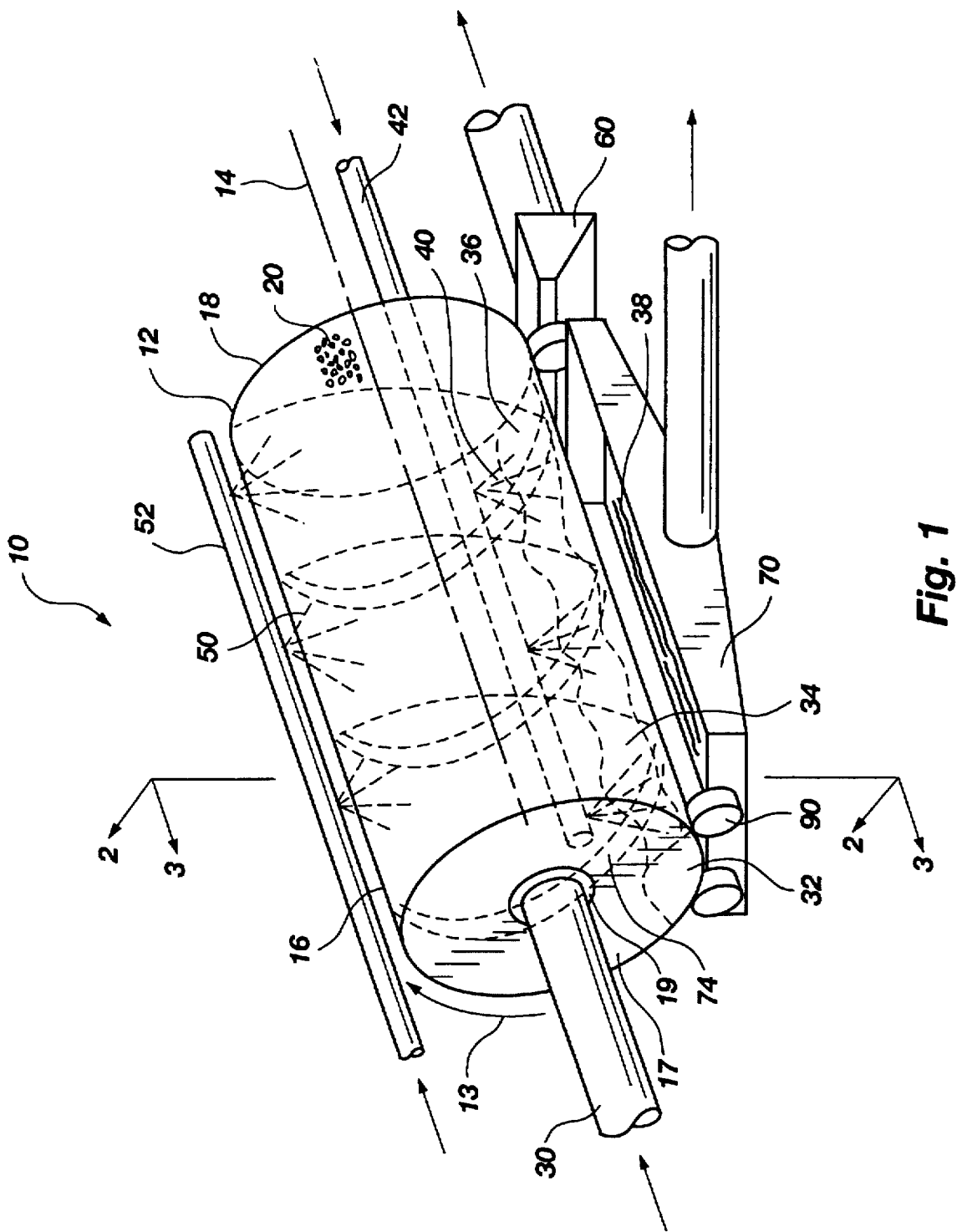
FIG. 1 is a perspective view of a preferred embodiment of the present invention.
Figure 2:
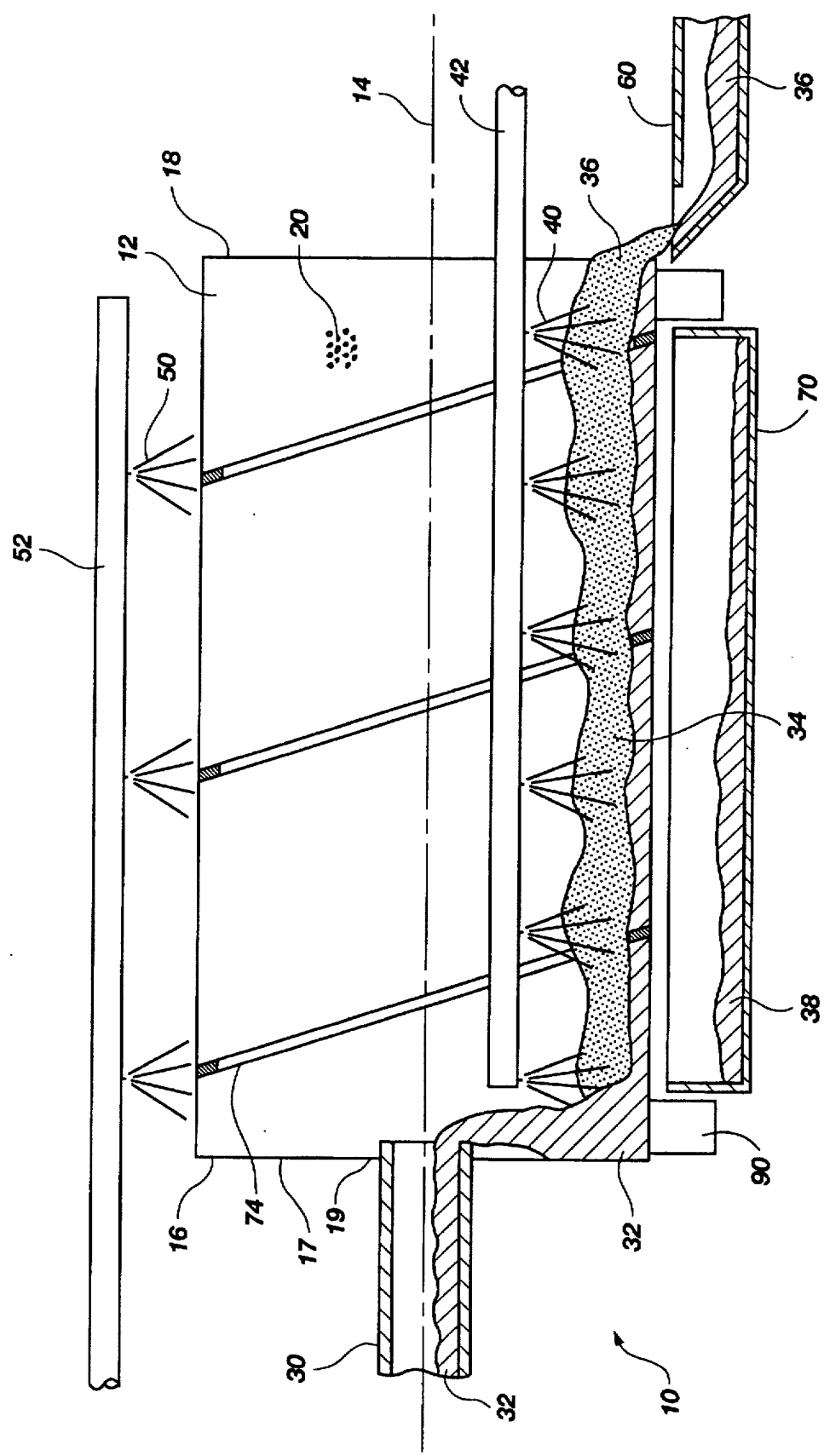
FIG. 2 is an elevation cross sectional view of a drum separator of a preferred embodiment of the present invention taken along line 2—2 of FIG. 1.
Figure 3:
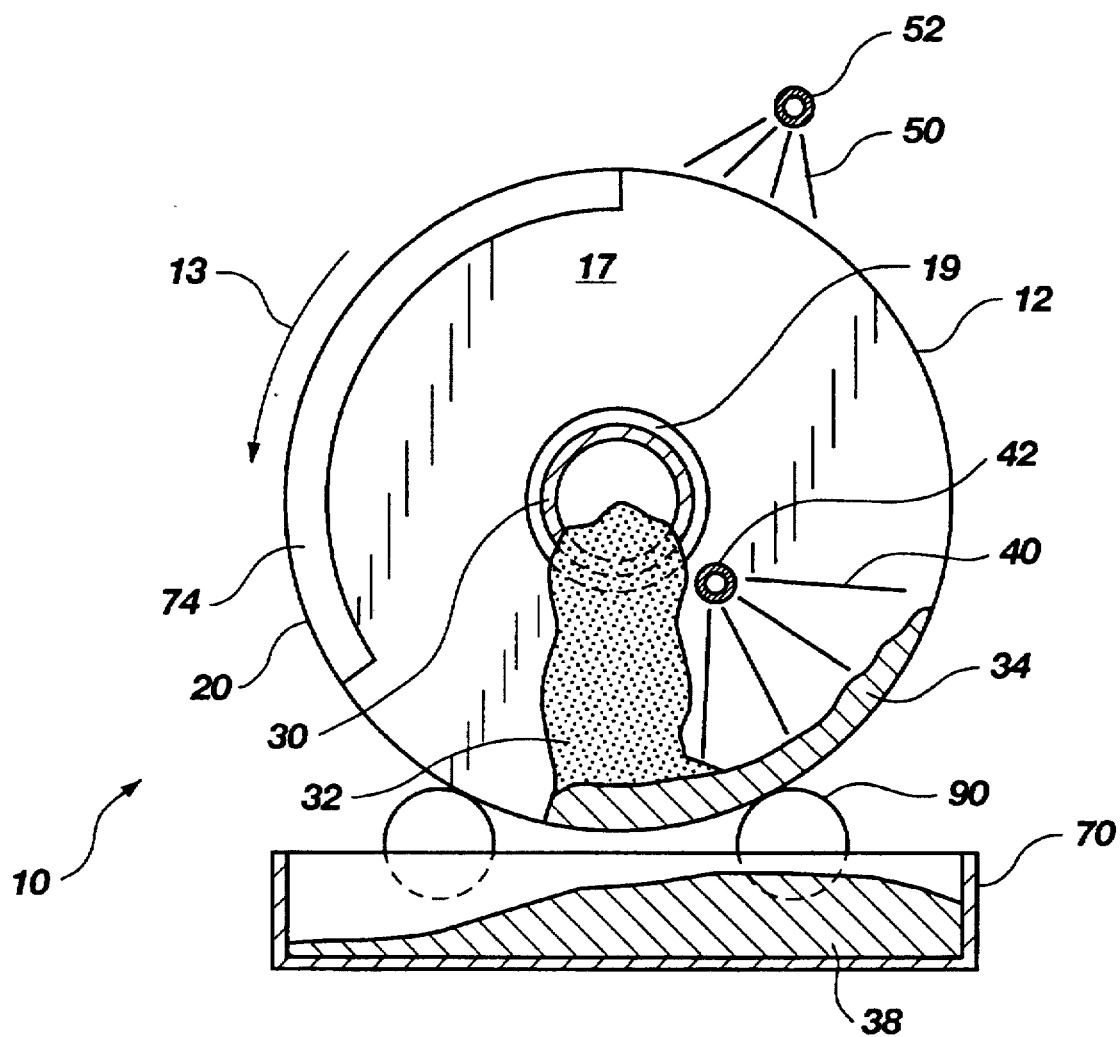
FIG. 3 is an elevation cross section view of a drum separator of a preferred embodiment of the present invention taken along line 3—3 of FIG. 1.

As illustrated in FIGS. 1–3, a drum separator 10 in accordance with a preferred embodiment of the present invention is shown. A drum 12 is provided having a generally cylindrical shape. The drum 12 is rotated 13 about an axis of rotation 14 generally concentric with the axis of the drum 12. The drum 12 has a horizontal orientation, or the axis of rotation 14 and the axis of the drum 12 are generally horizontal with respect to the ground. The drum has a proximal end 16 and a distal end 18. In the preferred embodiment, the proximal end 16 is partially closed by a plate 17 attached to the proximal end. The plate 17 has a hole 19 formed generally in the center of the plate and at the axis of rotation 14. The distal end 18 is open.

Openings 20 are formed in the drum 12. The openings 20 are sized to permit only brine shrimp eggs (artemia cysts), comparably sized bodies, and water to pass through the openings 20 and out of the drum 12. The openings 20 are preferably sized in the range of 0.010 to 0.018 inches.

The drum 12 with its openings 20 may be a commercially available barrel made of wedge wire. The wedge wire is a sheet of metal with a uniform array of perforations. The wedge wire is typically wrapped around a mandrel to form a barrel of desired dimensions. Alternatively, the drum 12 may be formed of standard woven mesh screen, perforated sheet, or any other suitable material having appropriately sized openings.

Alternatively, a screen member may be disposed within the generally cylindrical surface of the drum 12. The drum 12 may have a plurality of screen members disposed along the surface of the drum 12. For the greatest efficiency, the maximum amount of surface area of the drum 12 should be comprised of screen.

A feed pipe 30 extends into the drum 12 through the hole 19 in the plate 17 at the proximal end 16 and feeds the artemia, cysts and debris into the drum 12. Alternatively, the artemia, cysts and debris may be fed into the drum by hand, such as by manually pouring from a sack or bucket, either directly into the drum 12 or by using a funnel or chute. In addition, a conveyor belt may be used.

The artemia, cysts and debris may be introduced into the drum as a slurry 32 or may be introduced dry. During the harvesting of the cysts, much of the water is drained away leaving the artemia, cysts and debris in a dry, or drained, condition. For purposes of this disclosure, the term dry referrers to the absence of a substantial amount of water, or a drained condition. As discussed more fully bellow, a slurry is preferable and is obtained by adding a liquid, such as water, to the artemia, cysts and debris.

The artemia may form an agglomeration 34 that traps the artemia cysts and debris 36. The debris 36 includes anything except the artemia cysts 38, such as the adult brine shrimp, sticks, weeds, brine fly, larval casings, and other debris collected with the harvest. As previously mentioned, the nature of the artemia is to agglomerate in a mass that traps the cysts and prevents the cysts from passing through the openings. In addition, the artemia and attendant debris tend to clog the openings in the drum, also preventing the cysts from passing through the openings.

A liquid source 40 provides a liquid, such as water, to the slurry 32 in order to maintain the artemia, cysts and debris in a slurry form. Because of the openings 20 in the drum 12, the water contained in the slurry 32 quickly passes out of the drum leaving the agglomeration as a gel-like mass. Trapped in the agglomeration 34, the artemia cysts 38 are prevented from passing through the openings 20. Therefore, the liquid source 40 must provide sufficient liquid to maintain the slurry and free the cysts from the agglomeration.

The liquid source 40 may be an internal spray jet disposed to spray against the slurry 32 within the drum to break up the agglomeration 34 of artemia, cysts and debris, as well as add liquid to the slurry. The internal spray jet may spray against the slurry 32 with sufficient force to break up the agglomeration 34, but without damaging the artemia cysts 38.

In the preferred embodiment, the liquid source 40 is a spray pipe 42 that extends into the drum 12 through the distal end 18. The spray pipe 42 has a plurality of apertures or nozzles disposed along its length. The size and density of the apertures along the pipe can be adjusted to affect the water pressure and penetrating depth within the agglomeration. These apertures or nozzles are directed to spray against the slurry 32 to break up any agglomeration of artemia, clean the cysts, and separate out debris. It is of course understood that the spray pipe 42 may extend into the drum 12 through either the proximal or distal ends 16 and 18.

An external spray jet 50 is disposed to spray against the external surface of the drum 12. As the slurry 32 moves through the drum 12, artemia and debris 36 are freed from the slurry 32 and agglomeration 34 and may clog the openings 20. The external spray jet 50 sprays against the openings 20 and dislodges the artemia and debris 36 from the openings 20. The external spray jet preferably sprays a fluid such as water; however, other fluids or gases, such as air, may be used. Using a water medium, a water pressure of 80 to 120 psi (lbs/in$^2$) was found most effective, but lower pressures may be used. Extreme pressures tend to cause misting which may irritate workers if the water medium is salt water.

In the preferred embodiment, the external spray jet 50 is a spray pipe 52 that extends along the length of the drum 12. The spray pipe 52 has a plurality of apertures or nozzles disposed along its length. The apertures or nozzles are directed to spray against the external surface of the drum 12 and the openings 20.

The artemia and debris 36 are removed from the drum 12 at the distal end 18. In the preferred embodiment, the distal end 18 of the drum 12 is left open so that the artemia and debris 36 are permitted to exit the drum containment. A catcher 60 is placed at the distal end 18 of the drum 12 to catch the artemia and debris 36 as they exit the drum. The catcher may be any type of collection device such as a pan, bucket, or chute.

A pan 70 is disposed underneath the drum 12 for collecting the artemia cysts 38. As the agglomeration 34 is broken up within the drum 12, the artemia cysts 38 pass through the openings 20 and into the pan 70 along with water from the liquid source and the spray jets. The artemia cysts and water may then be passed to a vibratory separator (not shown) to remove the water from the cysts.

The accumulation of the slurry 32 within the drum 12 and the rotation of the drum tend to move the slurry from the proximal end 16 to the distal end 18. The plate 17 at the proximal end prevents 16 the slurry from passing out the proximal end. In addition, a plurality of movement blades 74 may be disposed on the inner surface of the drum. The blades 74 are disposed at an angle with respect to the axis of the drum 12. As the drum 12 rotates, the blades 74 have a screwing motion that acts to move the slurry 32 from the proximal end 16 to the distal end 18. Alternatively, the blades 74 may form a continuous blade similar to a screw thread.

Figure 4:
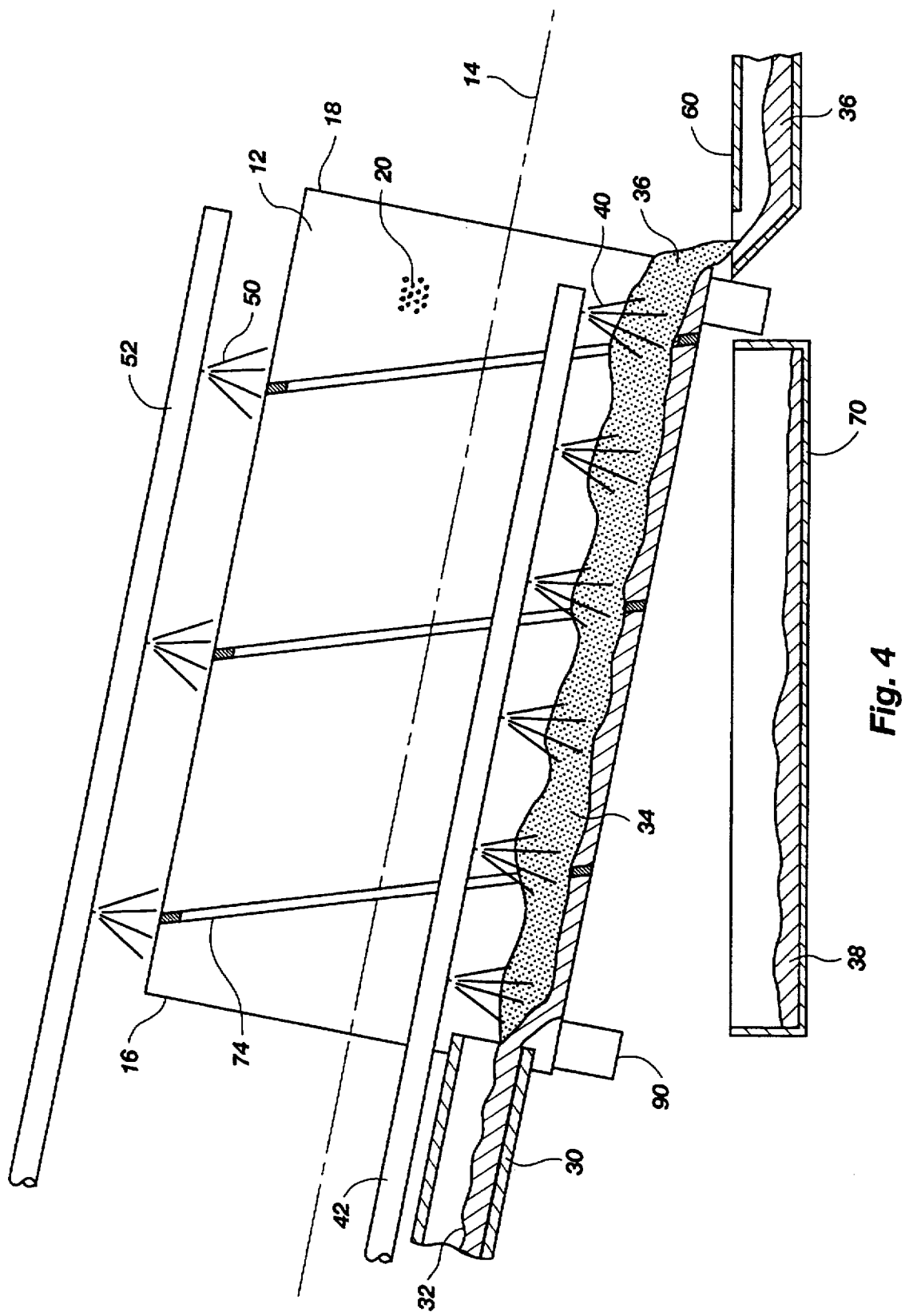
FIG. 4 is an elevation cross section view of a drum separator of an alternative embodiment of the present invention.

As shown in FIG. 4, the drum 12 may be disposed such that the axis of the drum 12 and the axis of rotation 14 form an acute angle with respect to a horizontal orientation. In this configuration, gravity and the accumulation of the slurry will move the slurry 32 through the drum 12.

Figure 5:
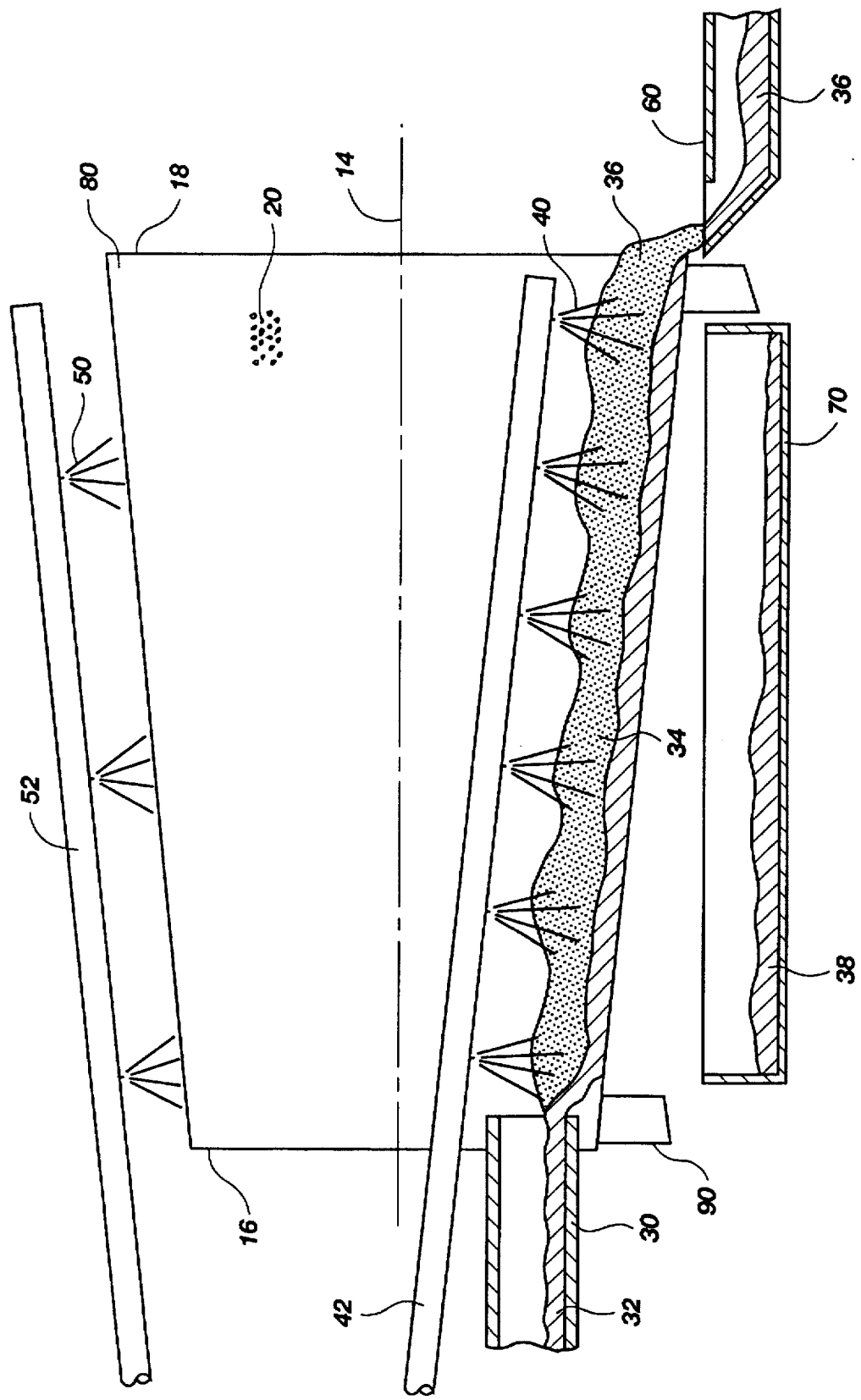
FIG. 5 is an elevation cross section view of a drum separator of an alternative embodiment of the present invention.

As shown in FIG. 5, the drum 80 may be conically shaped. The axis of the drum 80 and the axis of rotation 14 remain generally horizontal but the surface of the drum is angled due to the conical shape. This configuration also helps move the slurry 32 through the drum. Alternatively, the surface of the conical drum may remain horizontal.

Figure 6:
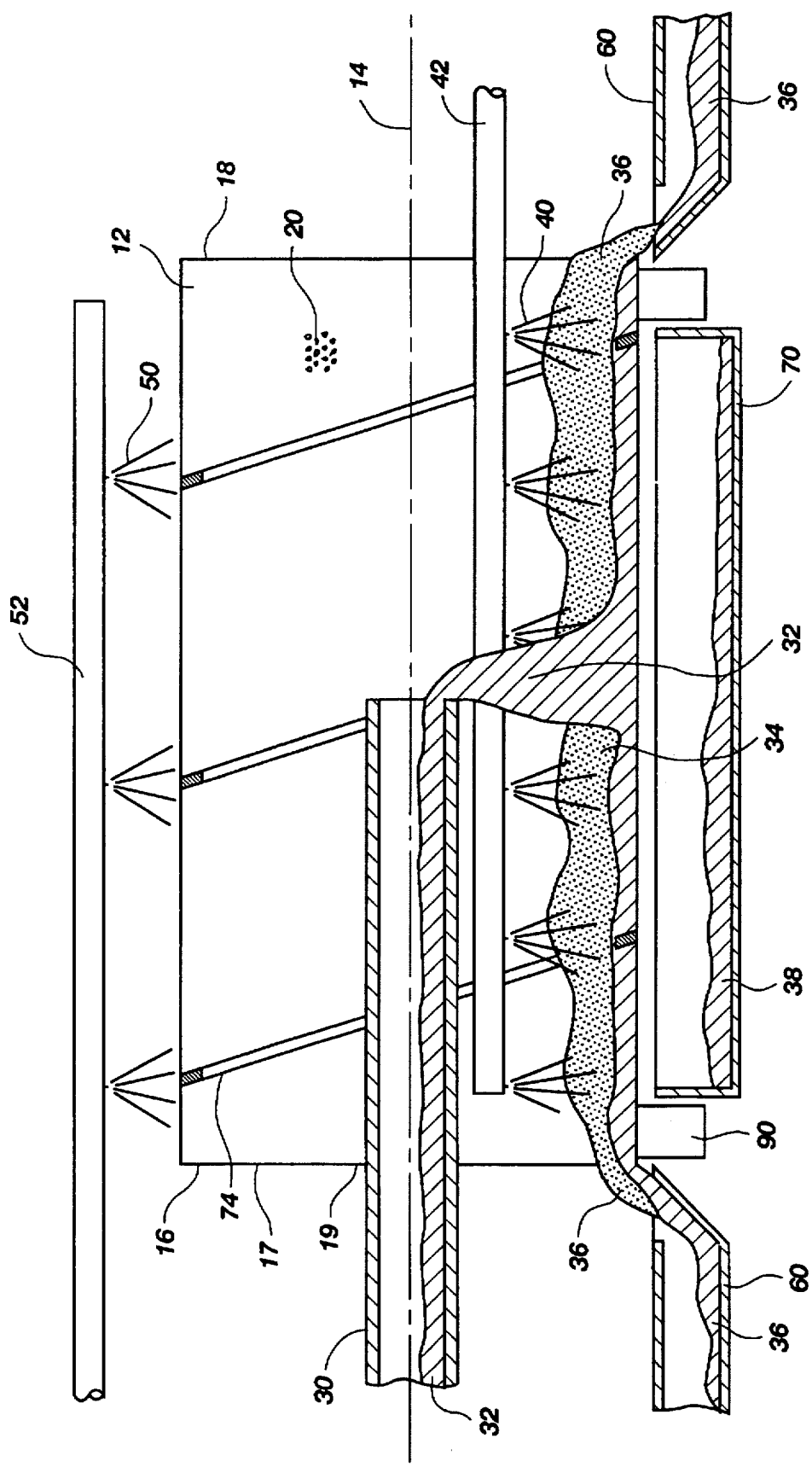
FIG. 6 is an elevational cross section view of a drum separator of an alternative embodiment of the present invention.

As shown in FIG. 6, the proximal and distal ends 16 and 18 of the drum 12 may be open while the feed means introduces the artemia, cysts and debris into the midpoint of the drum. In this configuration the slurry may move from the midpoint of the drum to both the proximal and distal ends 16 and 18.

In the preferred embodiment, the drum 12 is supported on and rotated by rollers 90, as shown in FIGS. 1–6. The rollers 90 are driven by an electric motor or gas engine (not shown). Alternatively, the drum 12 may be disposed on a shaft that is turned by the motor.

Referring to FIGS. 2 and 3, in operation, the slurry 32 containing the agglomeration 34 of artemia, cysts and debris 36 is fed into the rotating drum 12 through the feed pipe 30. As mentioned above, the artemia, cysts and debris are preferably introduced into the drum as a slurry, but may also be introduced dry. The slurry 32 moves from the proximal end 16 of the drum 12 to the distal end 18 of the drum 12 due to the accumulation of the slurry at the proximal end, rotation of the drum, rotation of the blades 74, and/or any angle of the axis of rotation 14 of the drum.

As the slurry 32 is fed into the drum 12, any water, or other liquid, contained in the slurry quickly drains through the openings leaving the artemia, cysts and debris as an agglomeration and gel-like mass. With the water drained, the agglomeration simply rolls or tumbles within the drum. The cysts and debris for the most part remain trapped within the agglomeration.

The liquid source 40 adds water, or another liquid, to the artemia, cysts and debris to maintain the slurry and free the cysts from the agglomeration. In addition, the liquid source may spray against the slurry 32 and break up any agglomeration 34 of artemia, cysts and debris. The spray also cleans the cysts and separates any attendant debris from the slurry. The artemia cysts 38 pass through the openings 20 in the drum 12 and are collected in the pan 70. As the agglomeration is broken up, the artemia and debris may become caught in the openings of the drum, thus clogging the openings.

The slurry 32 also tends to become laterally displaced within the drum, or settles on the bottom and clings to one side of the drum, as shown in FIG. 3. As previously mentioned, the nature of the artemia is to agglomerate, or stick together, trapping the cysts and debris. It is believed that the sticky property of the artemia and the rotation of the drum causes the lateral displacement of the slurry. The result is that the slurry becomes spread out along the bottom and side of the drum. Therefore, the depth of the slurry is reduced making it easier for the spray jets to penetrate the slurry and the surface area of the slurry is increased providing more area for the spray jets to spray against.

The external spray jet 50 sprays against the exterior surface of the drum 12 and the openings 20 to dislodge the artemia and debris 36 from the openings 20. The artemia and debris 36 exit the distal end 18 of the drum 12 and are collected by the catcher 60.

The above invention is particularly advantageous as the various elements are combined. The nature of the artemia is to agglomerate, or stick together in a group or gel-like mass, trapping the cysts and debris. When the slurry is added to the rotating drum, any fluid quickly drains and the agglomeration forms a cylindrically-shaped gel that rolls and tumbles within the drum. Sufficient fluid, such as water, must be added to maintain the slurry and free the cysts from the agglomeration. When sufficient water is added, the agglomeration becomes more fluid-like and less gel-like. The rotation of the drum helps to mix the fluid with the agglomeration. The fluid-like agglomeration tends to spread out along the bottom of the drum. As the drum rotates, the agglomeration tends to laterally displace along the side curvature of the drum.

In addition, the fluid source may be an internal spray jet that sprays against the slurry. The rotation of the drum helps spread out the agglomeration over a larger surface area for the spray jet to spray against. The agglomeration tends to move with the rotation of the drum due to the sticky nature of the agglomeration and the rotational momentum of the drum and slurry. As the agglomeration is carried further up the curved side of the drum, it is overcome by gravity and falls back down to the bottom of the drum. Thus, the rotation of the drum also helps break up the agglomeration by physically agitating and tumbling the agglomeration. In addition, the rotation of the drum helps to mix the water from the fluid source with the agglomeration.

The spray from the internal spray jet sprays against the agglomeration in the drum. The internal spray jet adds water to help keep the agglomeration more fluid-like and less gel-like so that it may spread out in the drum and be broken up by the drum rotation. The force of the spray from the internal spray jet acts against the spread out agglomeration to break up the agglomeration. In addition, the direction of the spray may be oriented to spray with the direction of rotation, against the direction of rotation, or both. If the spray is against the direction of rotation, a greater agitation is achieved between the spray and rotation. If the spray is with the direction of rotation, the agglomeration is carried further up the curvature of the drum so that it has a further distance to fall. Therefore, the rotation of the drum and the liquid source or internal spray jet combine to agitate the agglomeration to break up the agglomeration and mix the water with the agglomeration.

The spray from the external spray jet sprays against the exterior surface of the drum. The external spray jet dislodges artemia and debris from the openings and also adds water to the agglomeration. The water from the external spray jet enters the drum through the openings and runs down the sides of the drum. The water running down the sides meets the agglomeration being carried up and causes the agglomeration to separate from the drum and fall to the bottom. In addition, the spray may be oriented to spray against the upper exterior of the drum, the lower exterior of the drum, or both. If the spray is against upper side of the drum, artemia and debris will be dislodged and the water will run down the sides to help separate the agglomeration from the drum. If the spray is against the lower side of the drum, the spray will spray against the bottom of the agglomeration through the openings to some extent. In addition, the water will pass through the openings and help separate the agglomeration from the side of the drum. Therefore, the rotation of the drum and the external spray jet combine to separate the agglomeration from the drum and further agitate the agglomeration to help break up the agglomeration and mix the water with the agglomeration.

In addition to breaking up the agglomeration, the spray from the internal spray jet also acts against the cysts to force them through the opening in the drum. The internal spray jet, however, also forces artemia and debris into the openings and the agglomeration against the openings. The spray from the external spray jet dislodges the artemia and debris and forces the agglomeration away from the openings. In addition, both spray jets add water to the drum to keep the agglomeration more fluid-like. Therefore, the liquid source or internal spray jet and the external spray jets combine to keep the openings clear and the cysts passing through the openings. The spray jets and the rotation of the drum combine to break up the agglomeration so that individual cysts may pass through the openings while keeping the openings free of artemia and debris. The above invention provides a substantial improvement over prior art methods and devices for cleaning and separating artemia cysts from an agglomeration of artemia, cysts and debris.

It is to be understood that the described embodiments of the invention are illustrative only, and that modifications thereof may occur to those skilled in the art. For example, the spray jets may be positioned in various locations and oriented in various directions and the drum may be rotated in either direction, or even back and forth. Accordingly, this invention is not to be regarded as limited to the embodiments disclosed, but is to be limited only as defined by the appended claims herein.

What is claimed is:

1. A drum separator for separating artemia cysts from an agglomeration of artemia, artemia cysts and debris, comprising:
    a rotating drum, the drum having openings sized for permitting only artemia cysts and comparably sized bodies to pass through the openings and out of the drum;
    a feed means for feeding artemia, artemia cysts and debris into the drum;
    a liquid source for adding a liquid to the artemia, artemia cysts and debris, the liquid source comprising an internal spray jet disposed to spray against the artemia, artemia cysts and debris inside the drum for breaking up any agglomeration of artemia, artemia cysts and debris so that the artemia cysts may pass through the openings and out of the drum;
    at least one exit disposed at an end of the drum for permitting the artemia and the debris to exit the drum; and
    an exterior spray jet disposed to spray against the exterior surface of the drum for cleaning the artemia and the debris out of the openings in the drum.

2. The drum separator of claim 1, further comprising:
    a plurality of blades disposed at an angle on the inner surface of the rotating drum for moving the artemia, artemia cysts and debris through the drum.

3. The drum separator of claim 1, further comprising:
    an artemia cyst collecting means for collecting the artemia cysts that pass through the openings and out of the drum.

4. The drum separator of claim 3, wherein the artemia cyst collecting means comprises a pan disposed under the drum for collecting the artemia cysts as they pass through the openings in the drum.

5. The drum separator of claim 1, wherein the interior spray jet comprises a plurality of spray jets.

6. The drum separator of claim 1, wherein the interior spray jet comprises an elongated pipe having a plurality of openings and is disposed inside the rotating drum.

7. The drum separator of claim 1, wherein the liquid added to the artemia, artemia cysts and debris by the liquid source is water.

8. The drum separator of claim 1, wherein the exterior spray jet comprises a plurality of spray jets.

9. The drum separator of claim 1, wherein the exterior spray jet comprises an elongated pipe with a plurality of openings and is disposed along the exterior of rotating drum.

10. The drum separator of claim 1, wherein the exterior spray jet includes means for spraying water against the exterior surface of the drum.

11. The drum separator of claim 1, wherein the exterior spray jet includes means for spraying air against the exterior surface of the drum.

12. The drum separator of claim 1, wherein the feed means comprises a pipe disposed at an end of the drum for introducing the artemia, artemia cysts and debris into the drum.

13. The drum separator of claim 1, wherein the feed means comprises means for manually pouring the artemia, artemia cysts and debris directly into the drum.

14. The drum separator of claim 1, wherein the artemia, artemia cysts and debris are introduced into the drum through the feed means as a slurry.

15. The drum separator of claim 1, wherein the artemia, artemia cysts and debris are introduced into the drum through the feed means dry.

16. The drum separator of claim 1, wherein the drum is open at an end to permit the artemia and the debris to exit the drum.

17. The drum separator of claim 1, further comprising:
    a rotating means for rotating the drum.

18. The drum separator of claim 1, wherein the drum is disposed in a substantially horizontal orientation.

19. A drum separator for separating artemia cysts from an agglomeration of artemia, artemia cysts and debris, comprising:
    a rotating drum, the drum having openings sized for permitting only artemia cysts and comparably sized bodies to pass through the openings and out of the drum, the drum having an open end to permit artemia and debris to exit the drum through the open end and a substantially closed end to prevent the artemia, artemia cysts and debris from exiting the drum through the closed end;
    a feed means for feeding artemia, artemia cysts and debris into the drum;
    a liquid source for adding a liquid to the artemia, artemia cysts and debris in the drum for creating or maintaining the artemia, artemia cysts and debris as a slurry, the liquid source comprising an internal spray jet disposed to spray against the artemia, artemia cysts and debris inside the drum for breaking up any agglomeration of artemia, artemia cysts and debris so that the artemia cysts may pass through the openings and out of the drum; and an exterior spray jet disposed to spray against the exterior surface of the drum for cleaning the artemia and the debris out of the openings in the drum.

20. The drum separator of claim 19, further comprising a plurality of blades disposed at an angle on the inner surface of the rotating drum for moving the artemia, artemia cysts and debris through the drum.

21. The drum separator of claim 19, further comprising:

an artemia cyst collecting means for collecting the artemia cysts that pass through the openings and out of the drum.

22. The drum separator of claim 21, wherein the artemia cyst collecting means comprises a pan disposed under the drum for collecting the artemia cysts as they pass through the openings in the drum.

23. The drum separator of claim 19, wherein the interior spray jet comprises a plurality of spray jets.

24. The drum separator of claim 19, wherein the interior spray jet comprises an elongated pipe having a plurality of openings and is disposed inside the rotating drum.

25. The drum separator of claim 19, wherein the exterior spray jet comprises an elongated pipe with a plurality of openings and is disposed along the exterior of rotating drum.

26. The drum separator of claim 19, further comprising a rotating means for rotating the drum.

27. A drum separator for separating artemia cysts from an agglomeration of artemia, artemia cysts and debris, comprising:

a rotating drum, the drum having openings sized for permitting only artemia cysts and comparably sized bodies to pass through the openings and out of the drum;

a feed means extending into the drum for feeding artemia, artemia cysts and debris into the drum such that the artemia, artemia cysts and debris settles on a bottom of the drum and clings to a side of the drum as the drum rotates;

an internal spray jet disposed to spray against the artemia, artemia cysts and debris inside the drum for breaking up any agglomeration of artemia, artemia cysts and debris so that the artemia cysts may pass through the openings and out of the drum and for adding a liquid to the artemia, artemia cysts and debris for creating or maintaining the artemia, atremia cysts and debris as a slurry;

at least one exit disposed at an end of the drum for permitting the artemia and the debris to exit the drum; and an exterior spray jet disposed to spray against the exterior surface of the drum for cleaning the artemia and the debris out of the openings in the drum.

\* \* \* \* \*